Dec. 30, 1969  F. E. PAULIK ET AL  3,487,112
VAPOR PHASE HYDROFORMYLATION PROCESS
Filed June 5, 1967  3 Sheets-Sheet 1

INVENTORS
FRANK E. PAULIK
KEN K. ROBINSON
JAMES F. ROTH
BY
*Herman O. Bauermeister*
ATTORNEY

3,487,112
VAPOR PHASE HYDROFORMYLATION PROCESS
Frank E. Paulik, Creve Coeur, Ken K. Robinson, Ballwin, and James F. Roth, Creve Coeur, Mo., assignors to Monsanto Company, St. Louis, Mo., a corporation of Delaware
Filed June 5, 1967, Ser. No. 643,516
Int. Cl. C07c *45/10;* B01j *11/84*
U.S. Cl. 260—604                                      6 Claims

ABSTRACT OF THE DISCLOSURE

A hydroformylation process is shown which uses a supported rhodium catalyst, with olefins being charged in the vapor phase to react to aldehydes. A preferred catalyst is chlorocarbonylbis(triphenylphosphine) rhodium (I) and the carrier is selected from the group consisting of pumice, alumina, silica, silica-alumina, magnesia, diatomaceous earth, bauxite, titania, zirconia, clays, attapulgite, lime, magnesium silicate, silicon carbide, carbons and zeolites.

---

Figure 1:
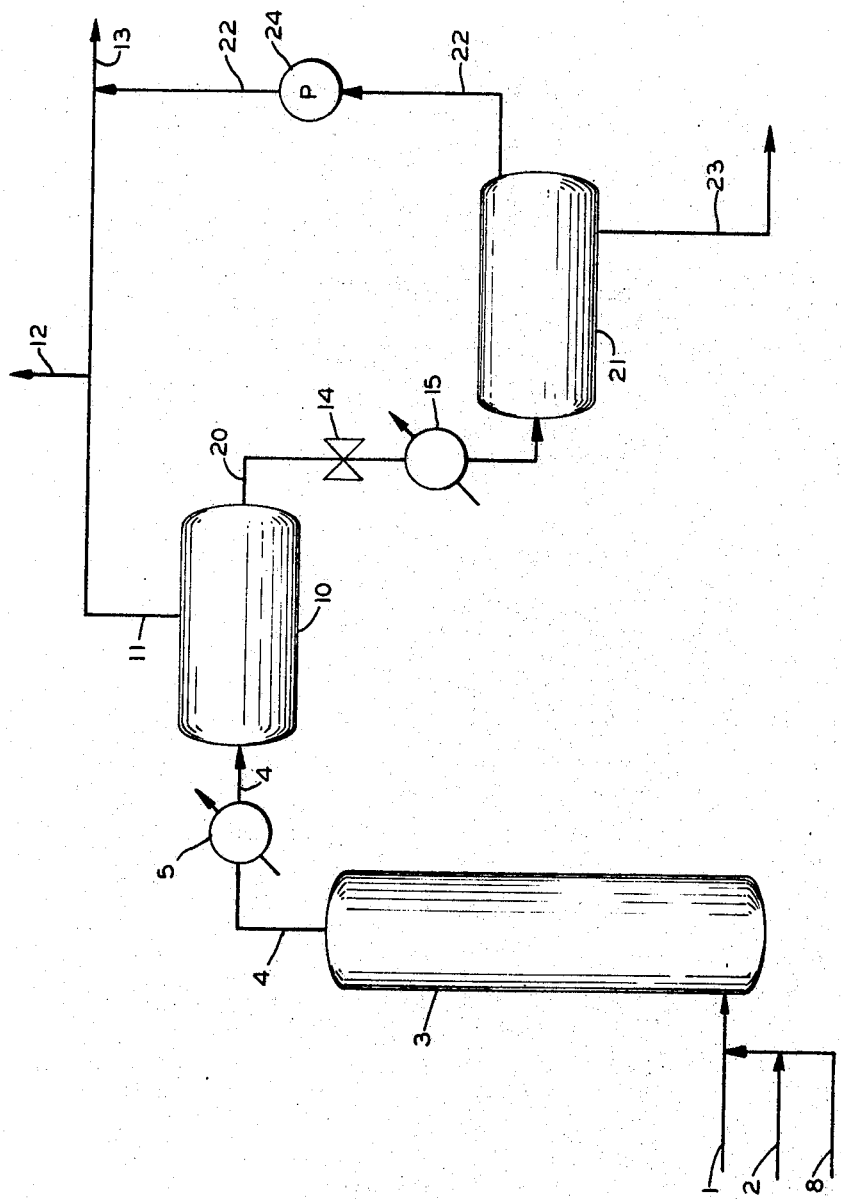

This invention relates to a process for the preparation of aldehydes by vapor phase hydroformylation of olefins. More particularly, it relates to the catalytic hydroformylation of gaseous olefins, such as propylene, with hydrogen and carbon monoxide using as a solid catalyst, the combination of a porous solid carrier having disposed thereon compounds and coordination complexes of rhodium to yield gaseous aldehyde products, such as butyraldehyde, selectively.

Hydroformylation processes are well known in the art and have been directed to the production of reaction mixtures comprising substantial amounts of aldehydes and alcohols by the reaction of olefins with carbon monoxide and hydrogen at elevated temperatures and pressures in the presence of certain catalysts dissolved in liquid reaction media. The prior art teaches the use of dicobaltoctacarbonyl or its various modified forms as well as carbonyls of other group VIII metals such as rhodium, ruthenium, iridium, etc. which may also be modified by ligands comprised of organic compounds of group V elements such as triaryl- and trialkyl-phosphine, arsine, etc. Certain disadvantages present in hydroformylation processes described in the prior art are catalyst instability, lack of product selectivity, low levels of catalyst reactivity and because of the liquid phase present, the need for larger and costly processing equipment for product isolation, as well as for catalyst recovery, catalyst regeneration and catalyst recycle to the reactor.

One particular disadvantage of hydroformylation processes of the prior art is their dependence upon the use of liquid phase catalysts comprised of metal carbonyls or certain modified metal carbonyls including dicobalt-octacarbonyl, tetracarbonyl-cobalt hydride and organophosphine substituted cobalt carbonyls, which necessitate the use of high pressures to remain stable under the high reaction temperatures employed. Dicobaltoctacarbonyl requires a very high partial pressure of carbon monoxide to maintain catalyst stability under hydroformylation conditions. These partial pressures of carbon monoxide are often in excess of several hundred p.s.i.g. at moderate temperatures in the range of 50° C. to 100° C., and range as high as 1000 p.s.i.g. to 3000 p.s.i.g. carbon monoxide partial pressure under normal hydroformylation conditions. Organophosphine substituted complexes of dicobaltoctacarbonyl are often more stable in a liquid phase catalyst, in that they require considerably lower partial pressures of carbon monoxide and consequently can be used in a lower pressure hydroformylation process. However, even these catalysts are generally not stable enough to withstand the severe operating conditions employed for product isolation and catalysts recovery in the hydroformylation process.

One particular disadvantage of hydroformylation processes of the prior art is their dependence upon the use of liquid phase catalyst systems comprised of metal carbonyls or certain modified metal carbonyls dissolved in a liquid reaction medium. In liquid phase systems, additional processing steps are necessary for separation of products from the catalyst solutions, and there are always handling losses of the catalyst. This handling of the catalyst solution in liquid phase processes requires the use of large and costly processing equipment for separation of the product, and for catalyst recovery and catalyst recycle to the reaction zone. Also, the losses of the metal complex due to handling of the catalyst solutions are costly because the metal complexes per se are very expensive. For example, the prior art hydroformylation reaction utilizing a cobalt carbonyl catalyst in liquid phase suffers a serious disadvantage due to substantial losses of the cobalt carbonyl catalyst during the necessary handling for separation of product from the catalyst solutions. It is well known that such solutions readily decompose during the processing steps for product separation so that the cobalt plates out as an inactive coating on the walls of the reactors and piping. This is a serious defect since significant losses of catalyst occur. The catalyst solution thus loses its effectiveness and the precipitated cobalt metal is difficult to remove and recover. Furthermore, separation of products from catalyst solutions of the conventional liquid phase processes, such as the cobalt catalyzed process, results in the cobalt carbonyl catalyst being carried into the ultimate product, from which the cobalt must be separated by processing in a "decobalting" operation. Here the cobalt is precipitated as the metal or as a salt which must then be dissolved and again transformed to the active cobalt carbonyl catalytic compound in the liquid phase. Significant losses of the catalyst metal complex occur during all these handling and processing steps.

The present invention using a solid catalyst in the absence of a liquid phase overcomes the above difficulties inherent in the handling and processing of a liquid reaction medium by providing a system for continuous separation of products from the solid catalytic phase.

These advantages are even more important when utilizing a catalyst comprised of the more expensive noble metal complexes where utilization in industrial applications requires an absolute minimum of catalyst losses.

It is, therefore, an object of the present invention to provide a process in which the catalyst is maintained in a solid phase so as to eliminate or minimize handling and losses of the catalyst.

Another object of this invention is to provide a more reactive and stable hydroformylation catalyst composition and process than has heretofore been described in the prior art. It is likewise an object of the present invention to provide more selective and more reactive hydroformylation catalyst composition and process which result in the production of higher yields of aldehydes with no substantial formation of alcohols or paraffins.

Still another object of the present invention is the provision of a novel vapor phase hydroformylation process enabling the efficient single stage production of aldehydes by reaction of olefinic hydrocarbons with carbon monoxide and hydrogen in the presence of an improved and more stable catalyst enabling the use of lower temperature, lower pressure and shorter contact time than generally possible heretofore, and eliminating product isolation, catalyst recovery and recycle steps, and also solvent recovery.

Another object of the present invention is to provide novel heterogeneous catalysts comprising the combination of an inert carrier having dispersed thereon coordination complexes of rhodium.

These and other objects of the present invention will become apparent to those skilled in the art from the accompanying description and disclosure.

It has now been found that the process of hydroformylation may be conducted with vapor phase reactants employing a novel catalyst, comprising as a solid catalyst the combination of a porous solid carrier upon which a coordination complex of rhodium is dispersed.

The catalytic nature of a solid catalyst for vapor phase reactants has been found to be completely different from liquid phase systems.

It has been found that metal complexes that serve as catalysts when dissolved in a liquid phase typically do not provide the same catalytic function when dispersed on a solid in the absence of a solvent. There is no theoretical basis known for predicting when a metal complex will be a catalyst in the absence of a solvent. An example set forth below in the present patent application demonstrates the loss of catalytic effectiveness when a complex is dispersed upon a porous solid carrier in the absence of a solvent. Quite unexpectedly, it has been found that the rhodium complexes of the present invention can be dispersed on solids and still provide excellent catalytic properties in the hydroformylation reaction.

In accordance with the present invention, olefinic compounds are converted selectively in the vapor phase to aldehydes having one more carbon atom than the olefinic compounds by reacting the olefinic compounds, in contact with a solid catalyst, with carbon monoxide and hydrogen at temperatures from about 75° C. to 250° C. and at partial pressures of carbon monoxide from 50 p.s.i.g. to 750 p.s.i.g., although higher pressures may be employed.

In carrying out the hydroformylation reaction selectively to produce aldehyde, it is necessary to supply at least one mole of carbon monoxide and one mole of hydrogen for each mole of olefin reacted. Excess carbon monoxide or hydrogen over the aforesaid stoichiometric amounts, however, may be present. The ratio of hydrogen to carbon monoxide preferably has a molar ratio of at least 1. Any ratio of hydrogen to carbon monoxide from 10:1 to 1:10 may be chosen, but ratios from 1:1 to 4:1 are preferred. Increasing the ratio of hydrogen to carbon monoxide is found to increase the reaction rate.

The gas feed to the reaction zone can also include inert gases such as nitrogen and carbon dioxide, particularly if it is desired to control the heat output resulting from the exothermic hydroformylation reaction. Consequently various synthesis and reformer gas streams available industrially may be used.

The catalyst system of this invention is comprised of a porous solid support having disposed thereon a coordination compound of rhodium, carbon monoxide, and a halide such as chloride, bromide and iodide, as well as suitable organo-phosphine, organo-arsine, and/or organo-stibine ligands and, if desired, other ligands, e.g., halide such as chloride, iodide and bromide and trihalostannate such as the corresponding chloride, bromide or iodide, necessary to satisfy the coordination number and oxidation number of the central metal atom, rhodium, and thus form a coordination compound or complex of rhodium such as $Rh[(C_6H_5)_3P]_2(CO)Cl$ dispersed upon an inert support. The term coordination compound or coordination complex used throughout this specification means a compound or complex formed by combination of one or more electronically rich molecules or atoms capable of independent existence with one or more electronically poor molecules or atoms, each of which may be capable of independent existence. Suitable organo-phosphorus, organo-arsenic, and organo-antimony ligands which may comprise part of the rhodium coordination compound or other catalyst of this invention are those consisting of tertiary organo-phosphorus, organo-arsenic, and organo-antimony compounds in which the phosphorus, arsenic, and antimony atoms are trivalent and are referred to in this specification as phosphines, arsines, and stibines, respectively. In the group of suitable ligands containing the trivalent phosphorus, arsenic, and antimony atoms employed in the catalyst of this invention, the individual phosphorus, arsenic, and antimony atom has one available or unshared pair of electrons. An aryl or aryloxy derivative of trivalent phosphorus, arsenic, and antimony with the foregoing electronic configuration is, therefore, a suitable ligand for the rhodium catalyst of this invention. Such radicals, therefore, are bonded to the phosphorus, arsenic, and antimony atoms, and the radicals are selected from the group consisting of aryl and aryloxy groups. However, the preferred phosphine, arsine, and stibine ligands are those consisting of at least one, but preferably three aryl- and/or aryloxy-groups as the organic moieties. For example, preferred ligands are illustrated by the following structural formula and examples: $MR_3$ where M is P, As, Sb, and R=phenyl($C_6H_5$—), phenoxy ($C_6H_5O$—) tolyl[$CH_3(C_6H_4)$—], xylyl($CH_3 \cdot C_6H_3 \cdot CH_3$), e.g., $P(C_6H_5)_3$ $P(C_6H_5O)_3$, $As(C_6H_5)_3$, $Sb(C_6H_5)_3$, $P[CH_3(C_6H_4)]_3$. However, a more preferred group of ligands includes the triphenylphosphines, triphenylphosphites, triphenylarsines and triphenylarsenites. The essential component is the aryl or aryloxy group, e.g., the phenyl or phenoxy radical. However, the molecule may also contain some aryl groups in addition to the aryloxy radical.

A preferred group of ligands associated with the rhodium and the organic phosphorus, arsenic, and antimony derivatives has aryl and aryloxy radicals having from 6 to 18 carbon atoms, carbon monoxide, and halogen radicals selected from the group consisting of chlorine, bromine and iodine. A preferred catalytic component is composed of a rhodium atom having as ligands, carbon monoxide, and at least one halogen ligand selected from the group consisting of chlorine, bromine and iodine, and at least two ligands selected from the group consisting of phosphine, arsine, and stibine derivatives having aryl or aryloxy radicals containing from 6 to 18 carbon atoms, which complex is dispersed upon a solid porous support.

A particular advantage of the rhodium carbonyl phosphine chloride compounds, such as

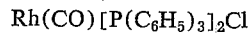
$$Rh(CO)[P(C_6H_5)_3]_2Cl$$

when used as a component of the solid catalyst system of this invention is their unusual stability. These compounds are extremely stable at elevated temperatures. Hydroformylation catalysts described in the prior art often undergo substantial decomposition under conditions necessary for product isolation, catalyst recovery and recycling processing, and are, therefore, less suitable.

Another advantage of this solid catalyst system is its ability to produce predominantly straight chain aldehyde products, and substantially no alcohols, paraffins or other byproducts even after long use. Catalysts employed in processes of the prior art generally cause production of substantial quantities of paraffins, alcohols and/or other undesirable high boiling byproducts such as acetals, etc., in addition to the desired aldehydes.

The solid supported rhodium complex catalyst of this invention is preformed prior to charging the reactor. For example, to preform the catalyst, this may be conveniently accomplished by reacting a rhodium carbonyl such as $Rh_2(CO)_4Cl_2$ or $Rh_2(CO)_4Br_2$ with a suitable organic ligand such as triphenylphosphine or triphenylarsine in a solvent forming $Rh(CO)X[M(C_6H_5)_3]_2$ where X is Br or Cl and M is P or As. Other rhodium components, of course, may be used in the preparation of the catalyst. Typical examples include rhodium containing compounds such as simple rhodium salts, organo-rhodium compounds, and coordination compounds of rhodium, specific examples of which may be taken from the following partial list:

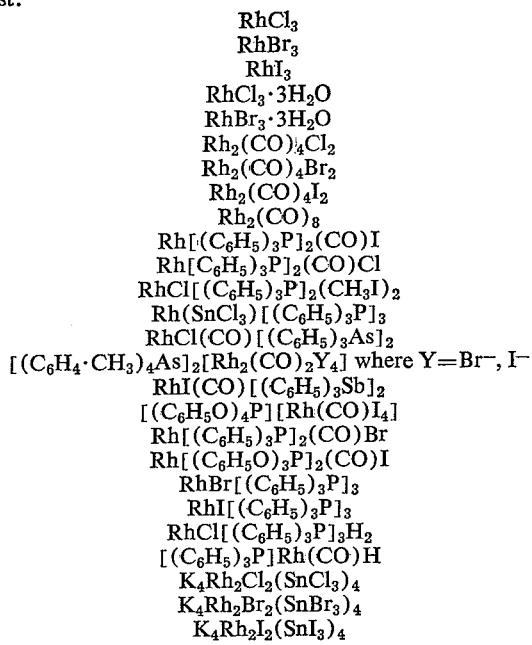

RhCl₃
RhBr₃
RhI₃
RhCl₃·3H₂O
RhBr₃·3H₂O
Rh₂(CO)₄Cl₂
Rh₂(CO)₄Br₂
Rh₂(CO)₄I₂
Rh₂(CO)₈
Rh[(C₆H₅)₃P]₂(CO)I
Rh[(C₆H₅)₃P]₂(CO)Cl
RhCl[(C₆H₅)₃P]₂(CH₃I)₂
Rh(SnCl₃)[(C₆H₅)₃P]₃
RhCl(CO)[(C₆H₅)₃As]₂
[(C₆H₄·CH₃)₄As]₂[Rh₂(CO)₂Y₄] where Y=Br⁻, I⁻
RhI(CO)[(C₆H₅)₃Sb]₂
[(C₆H₅O)₄P][Rh(CO)I₄]
Rh[(C₆H₅)₃P]₂(CO)Br
Rh[(C₆H₅O)₃P]₂(CO)I
RhBr[(C₆H₅)₃P]₃
RhI[(C₆H₅)₃P]₃
RhCl[(C₆H₅)₃P]₃H₂
[(C₆H₅)₃P]Rh(CO)H
K₄Rh₂Cl₂(SnCl₃)₄
K₄Rh₂Br₂(SnBr₃)₄
K₄Rh₂I₂(SnI₃)₄

The carrier or substrate which is employed in the present catalysts consists of a porous solid of such size that it can be employed in fixed or fluidized-bed reactors, e.g., from 400 mesh/inch to ⅜-inch particle sizes. The range of variation of the pore volume relative to solid weight is from 0.05 to 2.0 cm.³/gram of the porous phase.

The carrier materials are exemplified, but not limited by pumice, alumina, silica, silica-alumina, aged or deactivated silica-alumina cracking catalyst, magnesia, diatomaceous earth, bauxite, titania, zirconia, clays, both natural and acid treated such as the Super-Filtrols, attapulgas clay (attapulgite), lime, magnesium silicate, silicon carbide, activated and inactivated carbons, zeolites as well as the zeolitic molecular sieves, solid foams, such as ceramic honeycombs, and porous organic polymers. The above carriers are used as regular and irregular particles and as capillary tubes, and interspacing elements such as shapes, extrudates, ceramic rods, balls, broken pieces, tiles, and the like disposed within the reactor.

The solvent which is used to dissolve or disperse the metal catalytic component is a material having a low boiling point, e.g., high vapor pressure under reaction conditions. The range of variation of the boiling point (N.B.P., 760 mm. Hg) is quite broad, a preferred range being from 10° C. to 120° C.

It has been found that the preparation of a solid catalyst which is uniform in composition is preferably accomplished by the use of a volatile solvent component in the impregnation of an initially dry porous support with a catalytic component dissolved in the said solvents. The normal boiling point of the volatile liquid solvent is in the range of from 10° C. to 120° C. A preferable group of volatile solvents includes chloroform, carbon tetrachloride, benzene, acetone, methanol, ethanol, isopropanol, isobutanol, pentane, hexane, cyclohexane, heptane, toluene, pyridine, diethylamine, acetaldehyde, acetic acid and hydrofuran.

The preparation of the solid phase catalyst is carried out by first dissolving or dispersing the rhodium complex in the above described volatile solvent. The solid carrier is then impregnated with the solution of the rhodium complex, for example by pouring the solution upon the carrier, or immersing the solid carrier in an excess of the liquid solution, with the excess being subsequently removed.

The impregnated support or carrier is then maintained at a temperature sufficient to volatilize the solvent, preferably at a temperature between 15° C and 250° C., to permit drying of the composite solid catalyst. A vacuum may also be applied to the catalyst in order to volatilize the solvent, although the use of vacuum is not essential. During this stage of the process, the volatile solvent evaporates from the solid catalytic product. The final product is a solid supported catalyst.

In accordance with the invention, the vapor phase hydroformylation reaction is carried out by intimately contacting the gaseous olefin with gaseous carbon monoxide and hydrogen in the presence of the complex metal catalyst such as chlorocarbonylbis(triphenylphosphine) rhodium (I) dispersed upon an inert carrier such as alumina, at such temperatures and pressures suitable to form the hydroformylated product. The temperature accordingly is in the range of 75° C. to 250° C. with the preferred range being 100° C. to 165° C. Carbon monoxide partial pressure of the order of 1 atmosphere or less may be employed; however, 150 p.s.i.g. to 500 p.s.i.g. partial pressure of carbon monoxide is generally preferred. Higher partial pressures, even to the extent of 750 p.s.i.g. and higher, of course, may be used if desired under appropriate conditions.

In general, higher rhodium complex loadings on the catalysts produce a faster reaction rate. Loading of rhodium compounds or complex on the inert carrier (based on rhodium metal content) between 0.1 wt. percent and 5 wt. percent are generally satisfactory, with a preferred range being 0.3 wt. percent to 3 wt. percent.

The hydroformylation reaction of the present invention is conducted with olefinic feedstock having from 2 to 15 carbon atoms or preferably 2 to 5 carbon atoms, including both monoolefins and diolefins. The use of propylene as the feedstock for the production of butyraldehydes, has been found to favor the production of n-butyraldehyde relative to isobutyraldehyde. The invention also includes other olefins, e.g., ethylene to obtain propionaldehyde, and decenes to obtain undecaldehydes. The various isomeric starting materials are also contemplated.

The method of conducting the present invention is to make use of a solid phase catalytic system based upon a rhodium complex dispersed upon a porous support. The temperature at which the reaction is conducted is sufficient to permit the withdrawal of the aldehyde products as a vapor or gas stream from the reaction zone wherein the olefin feedstock is charged as a vapor to the said solid phase catalytic system. The apparatus employed is conventional in vapor phase processes being composed of catalytic reactors in which the supported catalyst is located, for example, as packed towers or as trays of the catalyst, with suitable feed and discharge means for the gaseous reactants and the recovery and separation of the liquid aldehyde and alcohol products from any unreacted gases. The use of a vapor phase operation avoids the leaching out of the active catalytic coordination complexes as would be encountered in a liquid phase process.

The product gas stream is passed through separation means for recovery of the aldehyde product, while unreacted olefins as well as carbon monoxide and hydrocarbon are recycled to the reaction zone.

In carrying out the typical hydroformylation reaction selective to produce aldehyde, it is necessary to supply at least one mole of carbon monoxide and one mole of hydrogen for each mole of olefin reacted. Excess carbon monoxide or hydrogen over the aforesaid stoichiometric amounts, however, may be present. The ratio of hydrogen and carbon monoxide preferably has a molar ratio of at least 1. Any ratio of hydrogen to carbon monoxide from 10:1 to 1:10 may be chosen, but ratios from 1:1 to 4:1 are preferred. Increasing the ratio of hydrogen to carbon monoxide is found to increase the reaction rate.

The gas feed to the reaction zone can also include inert gases such as nitrogen and carbon dioxide, particularly if it is desired to control the heat output resulting from the exothermic hydroformylation reaction. Consequently various synthesis, and reformer gas streams available industrially may be used.

The drawings which form a part of the present patent application illustrate certain specific embodiments of the invention, but are not limitative of the invention. In the drawings, FIGURE 1 is a flow sheet demonstrating how the process of the invention can be carried out.

Figure 2:
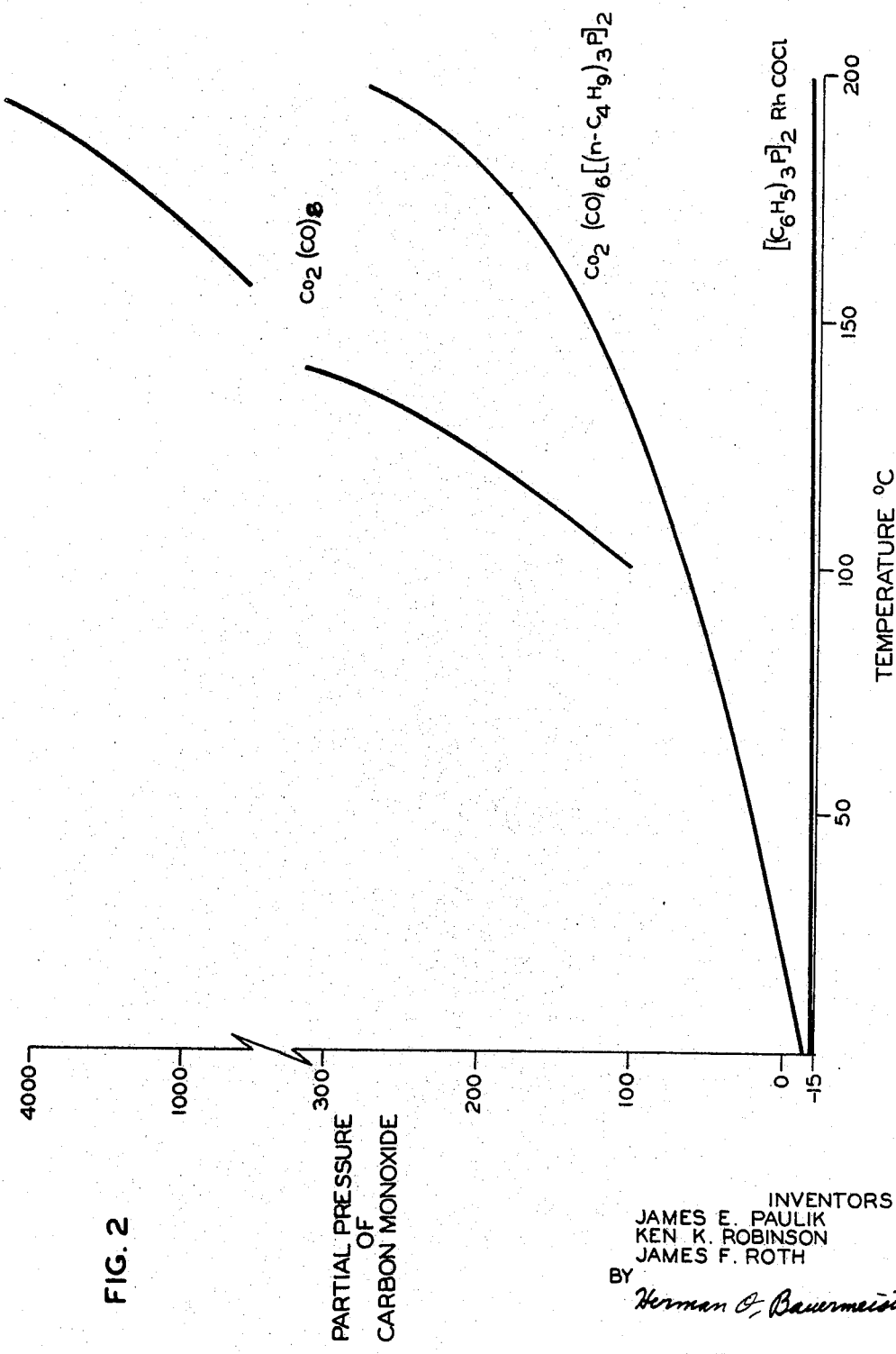

The additional drawings set forth the relationships among certain parameters of the invention. FIGURE 2 shows the relationship between the carbon monoxide partial pressure necessary to maintain stability (avoid decomposition) of the rhodium complex component of the solid catalyst, relative to the temperature. FIGURE 2 also compares the present rhodium complex catalysts as represented by chlorocarbonylbis(triphenylphoshpine) rhodium (I) relative to various cobalt compounds as prior art oxo catalysts. The low partial pressure of carbon monoxide in the case of the rhodium complex brings out the fact that the present process may be operated at low pressures so that both operating and capital costs are greatly reduced.

Figure 3:
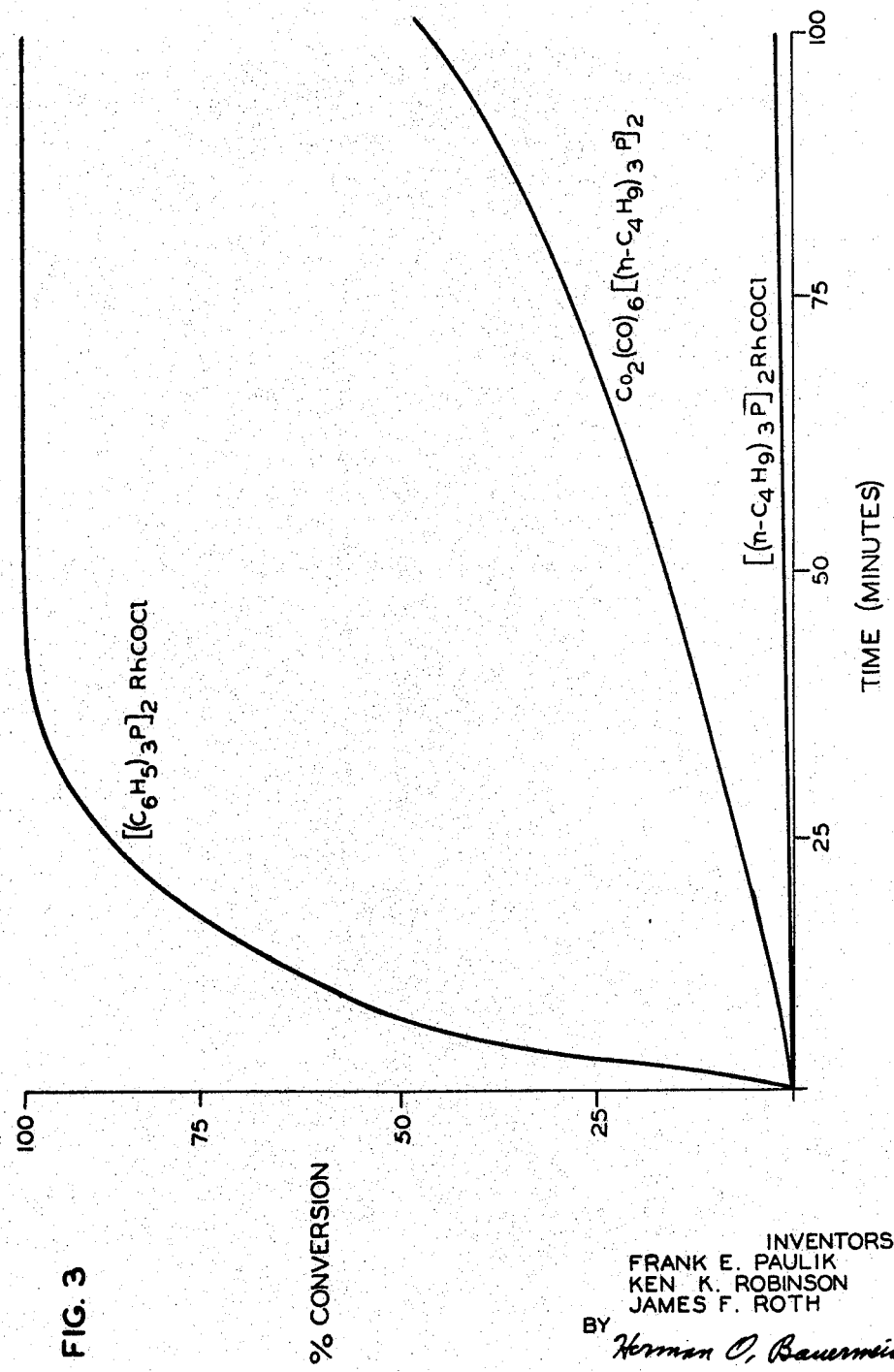

FIGURE 3 sets forth the relationship of reaction time (minutes) relative to the percent conversion. The individual lines shown in the diagram are based upon various rhodium and cobalt complex catalysts. It is seen that the rhodium aryl substituted phosphorus compositions give the highest conversions per unit time, e.g., greater reactivity.

For a better understanding of the process of the present invention, reference is now made to the acompanying FIGURE 1 of the drawings which illustrates a specific embodiment of the porcess. This illustration is not to be construed in any way as limiting the scope of the invention.

FIGURE 1 illustrates a vapor phase process wherein the reactant olefin (e.g., propylene) and the hydroformylated product (e.g., butyraldehyde) are removed in the vapor effluent from the reactor. In this operation propylene feed is introduced into reactor 3 through line 1, while the hydrogen and carbon monoxide feed (e.g., synthesis gas) is introduced through line 2. A recycle gas stream consisting principally of hydrogen and carbon monoxide with a small quantity of propylene is introduced through line 8. Catalytic reactor 3 contains the supported catalyst which is present, for example, as a fixed bed of catalyst. The typical catalyst loading is about 0.35 wt. percent (based on metal content), and comprises the rhodium complex chlorocarbonylbis(triphenylphosphine) rhodium (I) dispersed on an inert support such as 10–30 mesh, low surface area, porous alumina. The reactor operates at about 125° C. and 500 p.s.i.g. total pressure (carbon monoxide partial pressure about 240 p.s.i.g.); the normal gas rate is 150 lb./min. propylene, 200 lb./min. carbon monoxide, and 16 lb./min. hydrogen.

The gaseous reactor effluent, containing about 100 lb./min. propylene, 86 lb./min. butyraldehyde, 166 lb./min. CO, and 14 lb./min. H₂ exits through line 4, and is partially condensed in condenser 5 at about 10° C. The condensed phase consisting of greater than 90% butyraldehyde is separated from the noncondensables in a high pressure separator 10. The gases exit the separator through line 11, and after removal of a purge stream through line 12 to prevent build-up of insert gases, the remaining gases are vented at line 13, or preferably are recycled. The condensed phase is removed from high pressure separator 10 through line 20, let down in pressure through valve 14, cooled in exchanger 15, and then separated in vessel 21. The gases which contain dissolved dissolved propylene, liberated on reduction in pressure, exit through line 22, are repressured in compressor 24, and combine with line 11 gases to form the gaseous stream available at 13 for recycling.

The liquid from separator 21 represents the crude butyraldehyde which passes out through line 23 to the aldehyde purification area.

Although butyraldehyde is the desired product from the hydroformylation process of this invention, the butyraldehyde can be further processed to n-butanol, iso-butanol, and 2-ethylhexanol by combinations of subsequent separation, aldol-condensation, and hydrogenation steps.

The following examples illustrate specific embodiments of the present invention:

EXAMPLE 1

A solid supported catalyst containing a rhodium complex dispersed upon an inert porous support is prepared in the following manner: 1.1 grams of chlorocarbonylbis (triphenylphosphine) rhodium (I) having the formula $Rh(CO)Cl[P(C_6H_5)_3]_2$ is dissolved in 20 ml. of chloroform as solvent. The resulting solution is added to 50 ml. (43.4 g.) of a support consisting of 10–30 mesh, low surface area, porous alumina. The mixture is then vacuum dried overnight at ambient temperature. Thirty milliliters of the impregnated support is then charged into an 18 inch, stainless steel vertical reactor, ½ inch in diameter. The resulting catalyst bed, 10 inches in height, is covered with 4 ml. of inert packing material as a preheater. The reactor and process conditions as shown in Table 1. A 1.5° C. axial temperature gradient is observed over the catalyst bed.

The results of four runs are shown in Table 2. FIGURE 3 shows the conversion-time relationship (highest line) of Run 1 of Table 1, below. When Run 1 of this example is repeated except that an alkylphosphine rhodium complex, $Rh(CO)Cl[P(n-C_4H_9)_3]_2$, is used, instead of the arylphosphine complex cited above, similar product distributions are obtained. However, the rate of conversion is very much lower as shown at the lower conversion line of FIGURE 3.

TABLE 1

| Reaction conditions, Run No. | 1 | 2 | 3 | 4 |
| --- | --- | --- | --- | --- |
| Temperature, ° C | 148 | 148 | 148 | 148 |
| Partial pressure of CO, p.s.i. | 265 | 265 | 265 | 265 |
| Contact time, minutes | .92 | .69 | .54 | .44 |
| Reactor effluent flow,[1] cc./min. | 328 | 485 | 618 | 900 |
| Hydrogen flow,[1] cc./min. | 169 | 226 | 282 | 352 |
| Carbon monoxide flow,[1] cc./min. | 169 | 226 | 282 | 352 |
| Propylene flow,[1] cc./min. | 113 | 151 | 190 | 235 |
| Percent conversion (based on reactor effluent flow rate) | 36.1 | 26.5 | 23.9 | 5.5 |

[1] Standard cc./min.

TABLE 2.—LIQUID PRODUCT DISTRIBUTION IN WEIGHT PERCENT

| Run No. | 1 | 2 | 3 | 4 |
| --- | --- | --- | --- | --- |
| Propylene | 4.38 | 4.89 | 2.70 | 5.86 |
| isobutyraldehyde | 33.52 | 32.63 | 34.35 | 31.15 |
| n-butyraldehyde | 59.25 | 60.30 | 57.53 | 60.60 |
| Butanol | 0.04 | 0.46 | 0.04 | 0.23 |
| High boilers [1] | 2.81 | 2.20 | 5.38 | 2.44 |

[1] N.B.P. higher than n-butyraldehyde.

EXAMPLE 2

A solid supported catalyst containing a rhodium complex dispersed upon as inert support is prepared in the following manner: 1.11 grams of chlorocarbonylbis(triphenylphosphine) rhodium (I) having the formula $Rh(CO)Cl[P(C_6H_5)_3]_2$ is dissolved in 26 ml. of chloroform as solvent. The resulting solution is added to 50 ml. (8.8 g.) of a support consisting of 10–20 mesh, high surface area, activated carbon. The mixture is then vacuum dried overnight at ambient temperature. Thirty milliliters of the impregnated support is then charged into the fixed bed reactor and covered with 4 ml. of inert packing material as a preheater. The reactor and process conditions are shown in Table 1 and are identical to Run 1. A conversion level of 46 mole percent, based upon analysis of the reactor effluent, is obtained. The product consists mainly of aldehydes of which n-butyraldehyde is the predominast material.

EXAMPLE 3

A solid supported catalyst containing a rhodium complex dispersed upon a porous support is prepared in the following manner: 1.11 grams of chlorocarbonylbis(triphenylarsine) rhodium (I) having the formula $$Rh(CO)Cl[As(C_6H_5)_3]_2$$

is dissolved in 28 ml. of chloroform as solvent. The resulting solution is added to 50 ml. (8.5 g.) of a support, e.g., porous 10–20 mesh, high surface area, activated carbon (Nuchar). The mixture is then vacuum dried overnight at ambient temperature. Thirty milliliters of the impregnated support is then charged into the fixed bed reactor and covered with 4 ml. of inert packing material as a preheater. The reaction and process conditions are shown in Table 1 and are identical to Run 1. A conversion level of 31.8 mole percent, based upon analysis of the reactor effluent, is obtained. The product consists mainly of aldehydes of which n-butyraldehyde is the predominant material. The ratio: normal to iso butyraldehyde is about 4:1.

EXAMPLE 4

A solid supported catalyst containing a cobalt complex is dissolved in 26 ml. of chloroform as solvent. The relowing manner: 1.1 grams of hexacarbonylbis(tri-n-butyl-phosphine)dicobalt having the formula $$Co_2(CO)_6[P(n-C_4H_9)_3]_2$$

is dissolved in 26 ml. of chloroform as solvent. The resulting solution is added to 50 ml. (8.6 g.) of a support of porous 10–20 mesh, high surface area, activated carbon. The mixture is then vacuum dried overnight at ambient temperature. Thirty milliliters of the impregnated support is then charged into the fixed bed reactor and covered with 4 ml. of inert packing material as a preheater. The reactor and process conditions are shown in Table 1 and are the same as Run 1 except that temperatures and carbon monoxide partial pressures are increased to 174° C. and 300 p.s.i.g., respectively. A conversion level of less than 6 mole percent, based upon analysis of the reactor effluent, is obtained. The percent conversion-time relationship for the catalyst is plotted in FIGURE 3 (middle line). The product consists of normal and iso-butyraldehydes and considerable amounts of higher boiling components (about 40% selectivity to higher boilers).

EXAMPLE 5

The experiment in Example 1, Run 1 is repeated under identical conditions except that the catalyst is in continuous use for 335 hours. Similar results are obtained over the entire run. No decrease in catalyst activity or product selectivity and yield is observed.

EXAMPLE 6

A rhodium complex which is effective as a liquid phase catalyst for hydrogenation of olefins is iscorporated into a solid catalyst by dispersing it on an inert support in the following manner: 1.0 gram of chlorotris(triphenylphosphine) rhodium (I) having the formula $$RhCl[P(C_6H_5)_3]_3$$

is dissolved in 50 ml. of benzene as solvent at a temperature of 60° C. The resulting solution is added to 50 ml. (43.4 g.) of a support consisting of 10–30 mesh, low surface area, porous alumina. The mixture is then vacuum dried overnight at 50° C. Thirty milliliters of the impregnated support is then charged into the fixed bed reactor and covered with 4 ml. of inert packing material as a preheater. Hydrogen and butene-1 in a 1:1 mole ratio are passed through the reactor containing the above solid supported hydrogenation catalyst system at a temperature of 50° C., and a total reactor pressure of 15 p.s.i.g. The flow rates of hydrogen and butene-1 are 150 standard cc./min. for each gas. The effluent from the reactor is analyzed by gas chromatography. No hydrogenated product, e.g., butane is detected.

The solid supported catalyst is removed from the reactor and 50 ml. of benzene is added. The rhodium complex is "leached" from the alumina support and the solution is filtered to remove the solid support particles. Butene-1 and hydrogen are then sparged through the solution of rhodium complex in benzene at one atmosphere pressure, ambient temperature, e.g., 25° C., and at flow rates of 100 standard cc./min. each. The effluent gases are sampled and analyzed by gas chromotography. Greater than 60% of the butene-1 is converted to butane.

This experiment demonstrates that metal complexes which may function catalytically in liquid phase reactions do not necessarily function when dispersed on an inert solid support.

EXAMPLE 7

A solid supported catalyst containing a rhodium complex dispersed upon an inert support is prepared in the following manner: 1.0 gram of chlorotris(triphenylphosphine) rhodium (I) having the formula $RhCl[P(C_6H_5)_3]_3$ is dissolved in 50 ml. of benzene as solvent. The resulting solution is added to 50 ml. (43.4 g.) of a support consisting of 10–30 mesh, low surface area, porous alumina. The mixture is then vacuum dried overnight at ambient temperature. Thirty milliliters of the impregnated support is then charged into the fixed bed reactor and covered with 4 ml. of inert packing material as a preheater. The reactor and process conditions are shown in Table 1 and are identical to Run 1. No hydroformylation product is observed.

This example shows that the tri-arylphosphine substituted complex is inferior to the bis-arylphosphine substituted complex of Example 1 as a vapor phase hydroformylation catalyst.

What is claimed is:

1. A process for the production of aldehydes by the vapor phase hydroformylation of olefins, having from 2 to 15 carbon atoms, with carbon monoxide and hydrogen, which comprises contacting said reactants, in the vapor phase with a catalyst comprising a porous solid carrier having dispersed thereon a rhodium coordination complex having as ligands, carbon monoxide, and at least one halogen ligand selected from the group consisting of chlorine, bromine and iodine, and at least two ligands having the formula $MR_3$ where M is selected from the group consisting of phosphorus, arsenic, and antimony, and R is selected from the group consisting of aryl and aryloxy radicals having from 6 to 18 carbon atoms, and removing the product aldehydes.

2. A process as in claim 1, which is conducted at a carbon monoxide partial pressure of from 50 p.s.i.g. to 750 p.s.i.g., and at a temperature of from 75° C. to 250° C., the said process including the steps of removing from contact with the said solid catalyst, a product composed substantially entirely of aldehydes as a gaseous product, and condensing the said product.

3. A process as in claim 1 in which the said olefins are linear, and in which the said hydroformylation is conducted at a carbon monoxide partial pressure of from 150 p.s.i.g. to 500 p.s.i.g., and at a temperature of from 100° C. to 165° C.

4. A process as in claim 3 in which the said olefin feed is comprised of propylene, and the aldehyde product is butyraldehyde.

5. A solid catalyst for the production of aldehydes by a vapor phase hydroformylation of olefins, having from 2 to 15 carbon atoms, with carbon monoxide and hydrogen, which catalyst comprises a porous solid carrier having dispersed thereon a rhodium coordination complex having as ligands, carbon monoxide, and at least one halogen ligand selected from the group consisting of chlorine, bromine, and iodine, and at least two ligands having the formula MR$_3$, where M is selected from the group consisting of phosphorus, arsenic, and antimony, and R is selected from the group consisting of aryl and aryloxy radicals having from 6 to 18 carbon atoms.

6. A catalyst as in claim 5 where the rhodium coordination complex is chlorocarbonylbis(triphenylphosphine) rhodium (I) and the carrier is selected from the group consisting of pumice, alumina, silica, silica-alumina, magnesia, diatomaceous earth, bauxite, titania, zirconia, clays, attapulgite, lime, magnesium silicate, silicon carbide, carbons and zeolites.

References Cited

UNITED STATES PATENTS 2,880,241   3/1959   Hughes.

OTHER REFERENCES

Evans et al.: "Homogeneous Hydrogenation and Hydroformylation Using Ruthenium Complexes," Nature, vol. 208, Dec. 18, 1965, pp. 1203–1204.

Vaska et al.: "Carbonyl and Hydride-Carbonyl Complexes of Iridium by Reaction With Alcohols," J. A. C. S., vol. 83, June 20, 1961, pp. 2784–2785.

Osborn et al.: "Mild Hydroformylation of Olefins Using Rhodium Catalysts," Chemical Communications (London Chemical Soc.), No. 2, p. 17, Jan. 27, 1966.

Rusina et al.: "Formation of Rh (I)-Carbonyl Complex by the Reaction With Some Non-Alcoholic, Oxygen-Containing Solvents," Nature, vol. 206, Apr. 17, 1965, pp. 295–296.

PATRICK P. GARVIN, Primary Examiner

U.S. Cl. X.R.

252—429, 431

UNITED STATES PATENT OFFICE
CERTIFICATE OF CORRECTION

Patent No. 3,487,112      Dated December 30, 1969

Inventor(s) Frank E. Paulik et al

It is certified that error appears in the above-identified patent and that said Letters Patent are hereby corrected as shown below:

Column 5, line 41, "attapulgas clay" should be -- attapulgus clay --.

Column 9, line 25, "is dissolved in 26 ml. of chloroform as solvent. The re-" should be deleted and insert -- dispersed upon a porous support is prepared in the fol- --.

SIGNED AND
SEALED
MAY 12 1970

(SEAL)
Attest:

Edward M. Fletcher, Jr.
Attesting Officer

WILLIAM E. SCHUYLER, JR
Commissioner of Patents